C. V. MARQUART.
BRAKE BEAM.
APPLICATION FILED OCT. 10, 1910.
994,323.
Patented June 6, 1911.
2 SHEETS—SHEET 1.
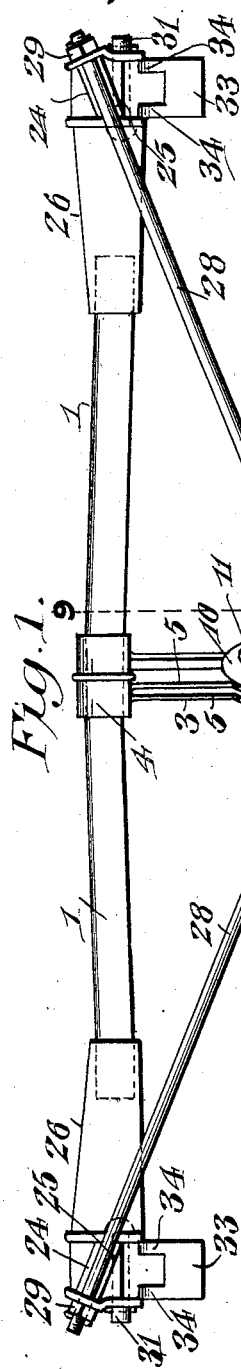
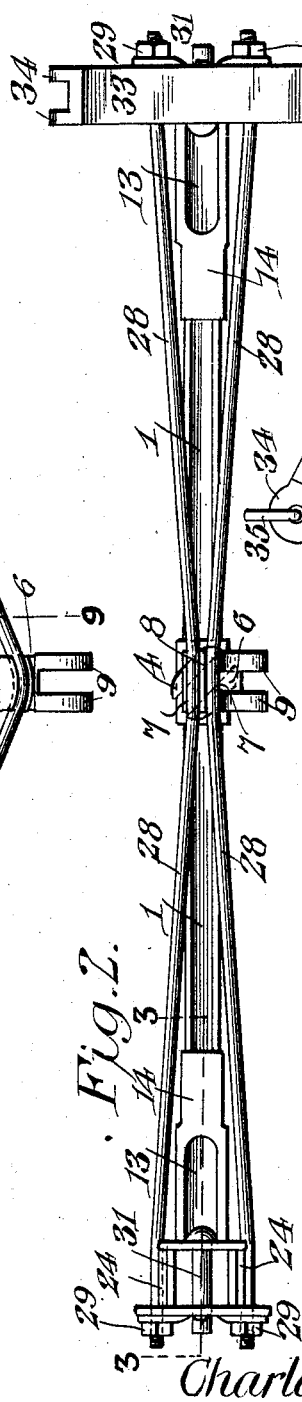
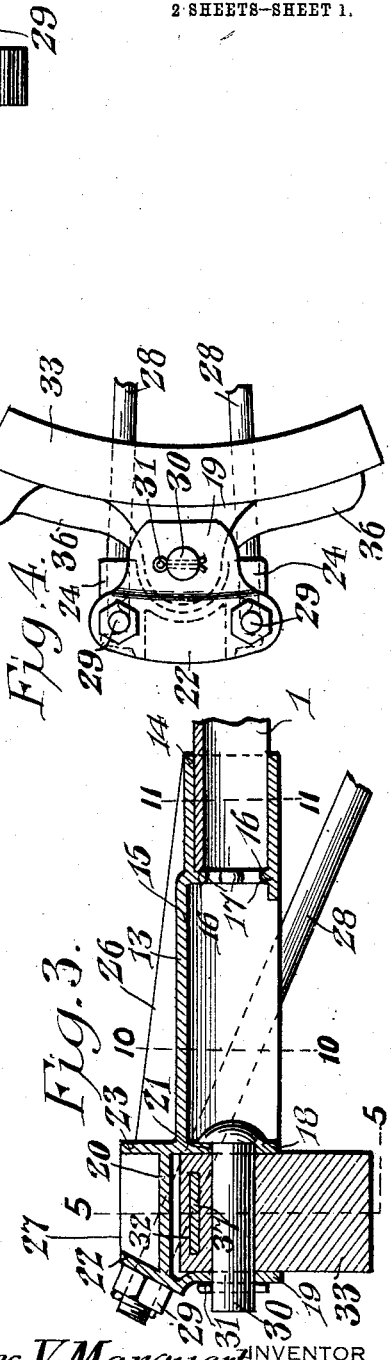
WITNESSES
Charles V. Marquart, INVENTOR
BY
ATTORNEY C. V. MARQUART.
BRAKE BEAM.
APPLICATION FILED OCT. 10, 1910.
994,323.
Patented June 6, 1911.
2 SHEETS—SHEET 2.
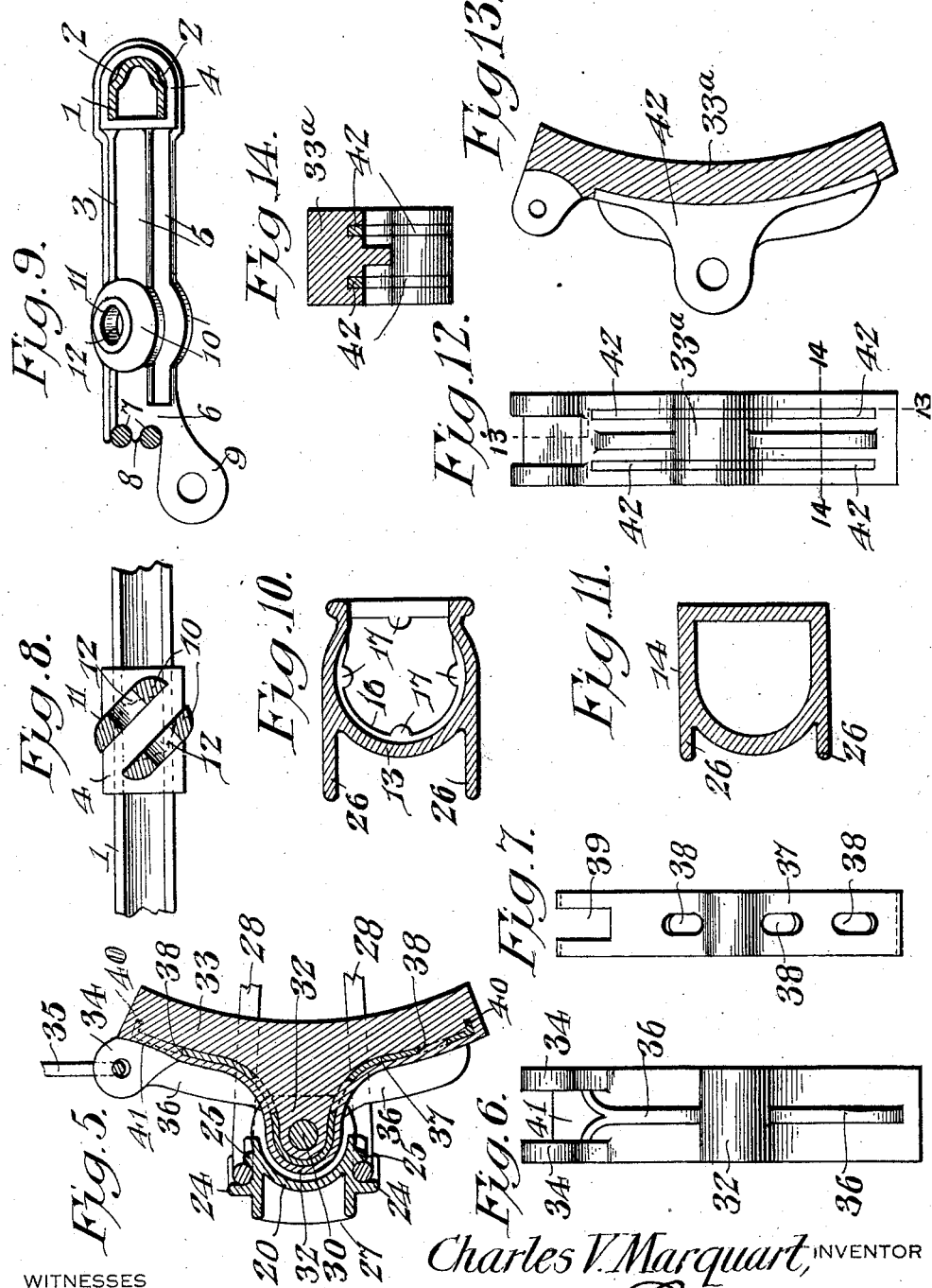
Charles V. Marquart, INVENTOR
WITNESSES
BY
ATTORNEY

UNITED STATES PATENT OFFICE.

CHARLES V. MARQUART, OF SANDUSKY, OHIO.

BRAKE-BEAM.

994,323.   Specification of Letters Patent.   Patented June 6, 1911.

Application filed October 10, 1910. Serial No. 586,368.

*To all whom it may concern:*

Be it known that I, CHARLES V. MARQUART, a citizen of the United States, residing at Sandusky, in the county of Erie and State of Ohio, have invented a new and useful Brake-Beam, of which the following is a specification.

This invention has reference to improvements in brake beams and associated parts, and its object is to provide a structure of requisite strength to withstand the authoritative tests, which at the same time shall be of few parts and correspondingly cheap to manufacture. Furthermore, the brake beam is of such structure that certain of the parts are susceptible of use with parts of other manufacture, so that owners of brake beams of other manufacture may apply certain parts involved in the present invention with a minimum of change and the scrapping of the least amount of material.

The invention will be best understood from a consideration of the following detailed description, taken in connection with the accompanying drawings forming a part of this specification, with the understanding, however, that the invention is not limited to the exact structure shown, but such structure may be variously modified so long as the salient features of the invention are retained.

In the drawings:—Figure 1 is a plan view of a brake beam with brake shoes thereon and constructed in accordance with the present invention. Fig. 2 is an elevation of the structure of Fig. 1 with one of the brake shoes omitted. Fig. 3 is a section on the line 3—3 of Fig. 2, but drawn to a larger scale. Fig. 4 is an end elevation of the structure of Fig. 3. Fig. 5 is a section on the line 5—5 of Fig. 3. Fig. 6 is a rear elevation of one of the brake shoes such as illustrated in Fig. 5. Fig. 7 is an elevation of a reinforcing strip applied to the brake shoe of Fig. 5. Fig. 8 is a section on the line 8—8 of Fig. 1. Fig. 9 is a section on the line 9—9 of Fig. 1. Fig. 10 is a section on the line 10—10 of Fig. 3. Fig. 11 is a section of one of the end sleeves on the line 11—11 of Fig. 3. Fig. 12 is a rear elevation of a modified form of brake shoe. Fig. 13 is a section on the line 13—13 of Fig. 12. Fig. 14 is a section on the line 14—14 of Fig. 12.

Referring to the drawings, there is shown a brake beam body 1 of general U-shape with the yoke part of the U compressed at the sides, as indicated at 2, in Fig. 9. The brake beam member 1 is bent at the central point so that the two ends are at an angle one to the other.

Applied to the central portion of the beam member 1 is a strut 3 having formed at one end a collar 4 with a passage therethrough of U-shape to receive the beam member 1, and this collar 4 will accommodate a beam member of normal U-shape or of tubular shape. The strut 3 has two side members 5 in spaced relation one to the other, and extending from a flat portion of the collar 4 and terminating at the other end in a yoke 6, in the outer end of which are formed two rounded seats 7 in spaced relation one to the other, being separated by a web 8. On one side of the yoke 6 are formed two projecting ears 9 in spaced relation one to the other. Between the collar 4 and the yoke 6 the side members of the strut are formed with bosses 10 of general circular and slightly conical contour, and each formed on the outer face with a flat portion 11 immediately surrounding a central perforation 12, the said perforation in the two bosses 10 being in line one with the other, and since the side members 5 are arranged in parallel spaced relation, but at an angle to the longitudinal axis of the collar 4, the passages 12 are also at an angle to the longitudinal axis of the collar 4. The passages 12 are designed to receive a bolt or pin connecting a portion of the brake controlling mechanism to the strut 3, such portion of the brake controlling mechanism passing through the space between the side members 5.

At each end of the brake beam there is provided a terminal member comprising a casting 13 having at one end a substantially U-shaped socket 14 designed to receive the corresponding end of the beam 1. Adjacent the socket 14 the casting 13 is of substantially U-shape, as indicated at 15, and the portion 15 is separated from the socket 14 by an internal flange or ledge 16 with lugs 17 thereon, the flange and lugs constituting an abutment for the corresponding end of the beam member 1. The portion 15 of the casting 13 may also be expanded laterally. That end of the portion 15 of the casting 13 remote from the socket 14 is formed with two spaced wings 18, 19, respectively, the wing 18 forming the terminal wall of the U-shaped portion 15 of the socket, and the wing 19 being joined to the wing 18 by a side web 20 out of line with the member 15 of the casting. This web 20 may be curved about the center line of alined passages 21 through the wings 18 and 19 for a purpose which will presently appear.

On opposite sides of the wing 19 there are formed ears 22, which may be set at an angle to the plane of the wing 19, and the wing 18 may have a flange extension 23 around it, while the two wings are joined by short spaced flanges 24, 25 on opposite sides, which, together with the web 20, constitute channel members.

Extending lengthwise of the casting 13 on opposite sides thereof are strengthening webs 26 from the terminal end of the socket member 14 to the flange 23 of the wing 18, and similar strengthening webs 27 extend between the ear members 22 and the flange 23.

The channels made up of the flanges 24, 25 and the web 20 are designed to receive the ends of tie rods 28, there being two such tie rods one on each side of the castings 13 and extending through the corresponding ears 22, these tie rods being threaded at the outer ends and their receiving nuts 29 which bear against the ears 22, the outer faces of these ears and the longitudinal axes of the side channels formed with the flanges 24 and 25 being perpendicular one to the other. The tie rods 28 at their central portions engage in the seats 7, and these seats are closer together than are the ears 22, so that the tie rods approach each other at the strut 3.

The U member 15 of the casting 13 is of a length to permit the insertion of a pin 30 through the passages 21 in the wings 18 and 19, and this pin is headed at one end, and at the other end provided with a passage for a cotter pin 31, whereby the pin 30 may be securely held in place, and at the same time may be readily removed when so desired. The pin 30 is designed to traverse an ear 32 projecting from the rear face of a brake shoe 33, the shape of which latter may conform to the other parts. This brake shoe is formed near one end with spaced ears 34 for a link 35 designed to suspend the brake shoe from a suitable part of the car or car structure, as is customary, the link 35 also serving to support the corresponding end of the brake beam through the brake shoe. The rear face of the brake shoe is formed with longitudinal strengthening webs 36. Cast in the brake shoe in the form best shown in Figs. 3 and 5 is a plate 37 conforming generally in shape to the rear face of the brake shoe. This plate 37 is provided with passages 38 at appropriate points and at one end with a recess 39, while the ends of the plate are bent at an angle thereto, as indicated at 40. The recess 39 is provided for an indentation 41 in the rear face of the brake shoe between the ears 34. The plate 37 is cast in the body of the brake shoe and is entirely housed therein. This plate may be made of steel of a tough character which will serve to greatly strengthen the brake shoe so that the liability of the brake shoe breaking is reduced to a minimum, and the weight of the brake shoe may therefore be greatly reduced without affecting its strength, and the structure is also greatly simplified. Such a brake shoe may wear to a greater degree than an ordinary cast brake shoe without impairing its strength, and when it finally becomes necessary to replace the worn out brake shoe, the amount of metal scrapped is small. A similar effect may be produced with the structure of Figs. 12, 13 and 14, in which plates 42 in parallel relation one to the other are inset edgewise into the rear face of the body of the brake shoe indicated at 33$^a$, these plates conforming in shape to the ear 32, and extending an appropriate distance into the body of the block, but leaving ample depth of material back of the engaging face of the brake shoe. This form of brake shoe has the same advantages as that of the other figures in strength and wearing qualities and small residue to be scrapped. Other forms of brake shoe may be used with the brake beam, and consequently the use of the brake beam is not confined to the particular brake shoe shown, although such shoe contributes to the cheapness of manufacture of the entire structure and reduces the necessary waste when repairs or replacements are made.

The brake beams before being passed by those having authority in such matters must stand certain tests as to strength. Of course, the brake beam may be made massive enough to stand such tests, but the weights and the cost of manufacture are prohibitive. The present brake beam because of its structure will not only withstand the tests demanded, but has the advantage of few parts, and markedly light weight with respect to the strength of the structure.

When the brake beam as a whole is installed on a car truck or car, the weight of the beam is sustained by the links 35 as heretofore stated, while the end of the strut 3 is upheld by any suitable supporting means engaging the ears 9 and the brake beam is actuated by suitable forces applied through structures made fast to the strut 3 at the bosses 10.

What is claimed is:—

1. A brake beam having a body member and terminal members each provided with a socket for the corresponding end of the body member, an intermediate open-sided connecting member extending from the socket, and wings at the other end of the connecting member from the socket, said wings being spaced apart and provided with alined passages in line with the interior of the connecting member.

2. A brake beam having a body member and terminal members each provided with a socket for the corresponding end of the body member, an intermediate open-sided connecting member extending from the socket, and wings at the other end of the connecting member from the socket, said wings being spaced apart and provided with alined passages in line with the interior of the connecting member, said terminal member being also provided at the end remote from the socket member with spaced ears in inclined relation to the length of the socket member, and spaced flanges leading from said ears and defining channels.

3. A brake beam structure comprising a body member, an intermediate strut member having a collar traversed by the body member, and spaced members extending from one side of the collar and terminating in a yoke member provided with spaced seats, and ears to one side thereof, terminal members each provided with a socket entered by the body member of the brake beam and each having spaced perforated wings at the end remote from the socket member and joined thereto by a connecting member of hollow open-sided construction, the outer wing having spaced ears formed thereon in inclined relation to the terminal member, and tie rods at intermediate points engaging the seats in the strut and the ends traversing the inclined ears in the terminal members, said tie rods having nuts applied to their outer ends exterior to the ears.

4. A brake beam comprising a body member of substantially U-shape in cross section, a strut member having at one end a collar of U-shape in cross section adapted to be traversed by the body member and provided with spaced side members extending from the collar and connected at the ends remote from the collar by a yoke having seats formed therein, and ears projecting from one side thereof, the said side members having bosses formed thereon with passages therethrough in alinement one with the other, and said members being at an angle to the longitudinal axis of the collar, terminal members for the body member of the brake beam each provided at one end with a socket of substantially U-shape to receive the corresponding end of the body member and beyond said socket portion having an open sided hollow connecting member terminating in perforated wings in parallel relation one to the other with the outermost wing provided with spaced inclined ears, the said terminal members being each provided with strengthening webs and flanges, and tie rods seated at intermediate points in the seats in the strut and from there expanding to the terminal members and passing through the inclined ears thereon, and nuts applied to the outer ends of the tie rods.

5. A brake beam comprising a body member of substantially U-shape in cross section, a strut member having at one end a collar of U-shape in cross section adapted to be traversed by the body member and provided with spaced side members extending from the collar and connected at the ends remote from the collar by a yoke having seats formed therein, and ears projecting from one side thereof, the said side members having bosses formed thereon with passages therethrough in alinement one with the other, and said members being at an angle to the longitudinal axis of the collar, terminal members for the body member of the brake beam each provided at one end with a socket of substantially U-shape to receive the corresponding end of the body member and beyond said socket portion having an open sided hollow connecting member terminating in perforated wings in parallel relation one to the other with the outermost wing provided with spaced inclined ears, the said terminal members being each provided with strengthening webs and flanges, and tie rods seated at intermediate points in the seats in the strut and from there expanding to the terminal members and passing through the inclined ears thereon, nuts applied to the outer ends of the tie rods, and brake shoes applied by the terminal members of the brake beam, said shoes each having an eye extending between the spaced wings of the terminal members and pivotally secured thereto and also having cast into the body of the brake shoe strengthening means of other character than the said body of the brake shoe.

In testimony, that I claim the foregoing as my own, I have hereto affixed my signature in the presence of two witnesses.

CHARLES V. MARQUART.

Witnesses:
 CHARLES H. LUTZ,
 FLORENCE MARQUART.

---

Copies of this patent may be obtained for five cents each, by addressing the "Commissioner of Patents, Washington, D. C."